Aug. 18, 1959      R. GLASER      2,899,868
AUTOMATICALLY OPERATED PROFILE MILLING MACHINE
Filed March 29, 1956
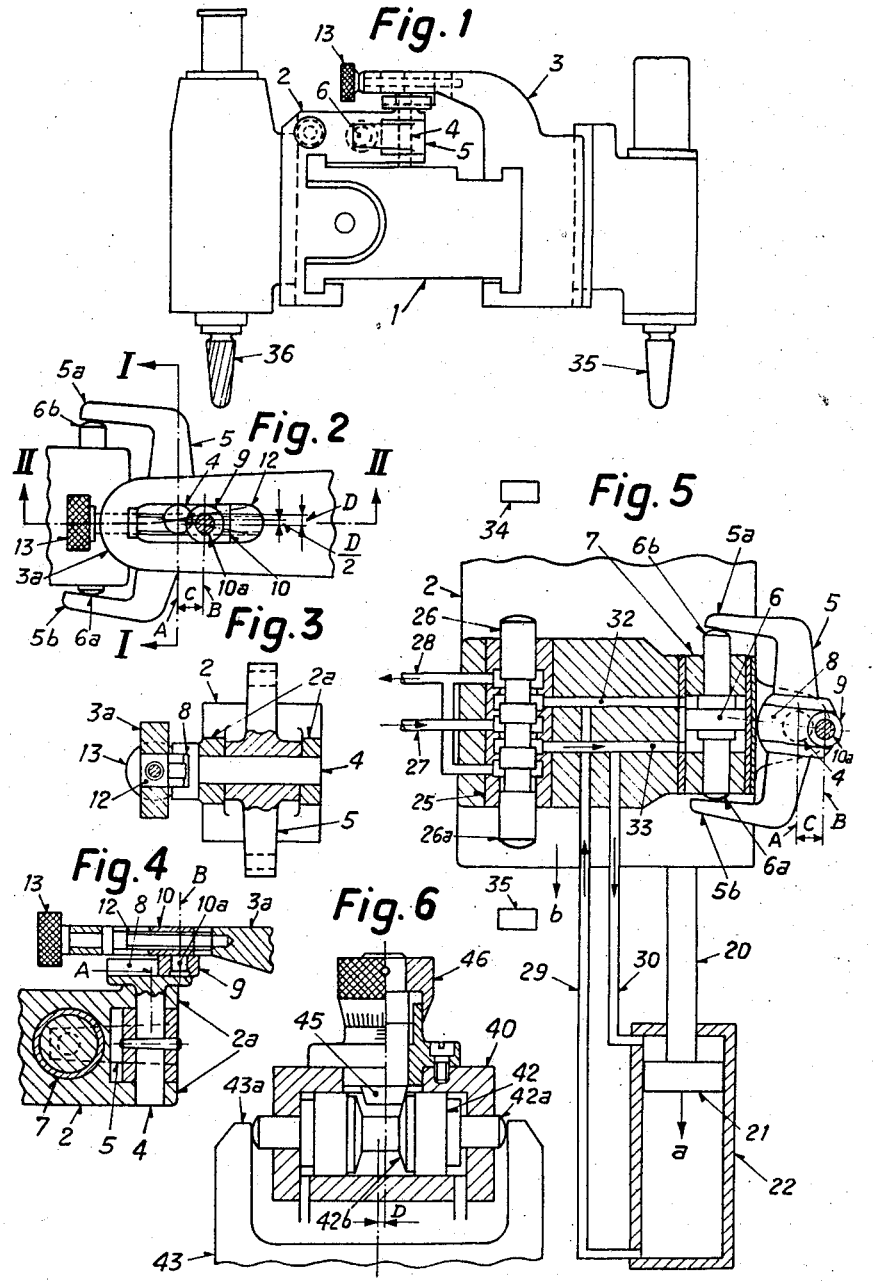
INVENTOR.
Rolf Glaser
BY
Richards & Geier
ATTORNEYS United States Patent Office 2,899,868
Patented Aug. 18, 1959

2,899,868

AUTOMATICALLY OPERATED PROFILE MILLING MACHINE

Rolf Glaser, Rorschach, Switzerland, assignor to Starrfräsmaschinen A.G., Rorschacherberg, Switzerland, a Swiss company Application March 29, 1956, Serial No. 574,750

Claims priority, application Switzerland April 2, 1955

4 Claims. (Cl. 90—13.1)

The present invention relates to automatically operated profile milling machines and refers more particularly to a device in such machines by means of which deflection errors caused by the tracer can be avoided.

In conventional automatic copying of dies and press moulds the diameter of the tracer is made larger than that of the milling cutter by the amount of lateral deflection of this tracer. In portions of the template, which extend parallel with respect to the direction of feed, the deflection of the tracer is smaller than that provided for by the difference in diameter. The differences in the deflection of the tracer give rise to discrepancies between the measurements of template and workpiece.

An object of the present invention is the provision of a device in automatically operated profile milling machines, which will permit to avoid deflection errors of the tracer by compensating for such deflections. According to the present invention the tracer and the milling cutter are arranged on two separate slides and are connected with each other over intermediary members, means being provided in said members to impart a relative movement to said tracer slide with respect to said cutter slide corresponding to the difference in deflection of the tracer.

In order that the invention may be better understood and put into practice two embodiments thereof are hereinafter described by way of example and with reference to the accompanying drawings, in which:

Fig. 1 shows a milling machine and illustrates the arrangement of the two slides on an arm of the frame of the milling machine.

Fig. 2 is a plan-view of the connection between the two slides,

Fig. 3 is a section along line III—III in Fig. 2,

Fig. 4 is a section along line IV—IV in Fig. 2,

Fig. 5 shows schematically the hydraulic control means for the two slides, and

Fig. 6 is a modification of the connection between the slides.

On the carrier 1 mounted on the base of a milling machine (not shown), the cutter slide 2 and the tracer slide 3 are arranged for horizontal reciprocating movements.

In order that both slides may be driven from the same source of power, these slides are operatively connected with each other. The connection is, however, not a rigid one, as in prior art, but is adjustable, in a manner described hereinafter in greater detail to allow for a compensation of errors caused by undue deflections of the tracer. It will be further noted that cutter slide and tracer slide are arranged in well known manner, above a workpiece slide and a template slide, respectively. The latter two slides, which are not shown in the drawing, are interconnected with each other by known means for movements in transverse direction with respect to cutter slide and tracer slide, respectively, in a stepwise manner at the end of each stroke of the last mentioned slides. As shown in Fig. 1, the cutter slide 2 supports a cutter head 2b and the tracer slide a tracer head 3b, both of these heads being arranged for vertical sliding movement in guides 2c and 3c. This movement is caused by elevations and depressions of the template traced by a tracer 35a in well known manner. In Figs. 2–5 the connection between the two slides is shown. In the cutter slide 2 a pivot 4 (Figs. 3 and 4) is rotatably supported in the eyes 2a, on which a fork member 5 is mounted. The ends 5a and 5b of the fork member abut against the ends 6a and 6b of a hydraulically controlled piston 6. The piston 6 is guided in a cylinder 7, which is seated in a bore of the cutter slide 2. Upon displacement of the piston 6 the pivot 4 is rotated about its axis A by the fork member 5. In the head of pivot 4 a lateral groove 8 is arranged, which in a median position of the piston 6 extends at right angles to the path of the cutter slide. A follower roll 9 engages this lateral groove 8, the roll being journalled on a pin 10a of a slide 10. The latter is supported in a slot 12 of the arm 3a of the tracer slide 3 and may be displaced manually in the slot 12 by means of the setting screw 13. If the slide 10 is so adjusted that the axis B of the follower roll is positioned over the axis A of the pivot 4, the respective displacement of the cutter slide 2 and the tracer slide 3 is zero, i.e. the connection is rigid, which condition is necessary for alignment of work piece and template. In order to drive or reciprocate the cutter slide 2 (Figs. 1 and 5) along the carrier 1, hydraulic cylinder and piston means are provided, including a piston rod 20 connected to slide 2, and a piston 21 sliding in a cylinder 22. The cylinder 22 is rigidly connected with and supported by the carrier 1 in a manner not shown. Movement of the cutter slide 2 is transmitted to the tracer slide 3 over the piston 6, fork 5, roll 9 and slide 10.

For hydraulic control, reversing means are provided, which comprise a valve sleeve 25 and a slide valve 26 movably arranged therein. Conduits 29 and 30 connect the valve sleeve 25 to the cylinder 22 at opposite ends thereof. The valve sleeve 25 communicates furthermore with conduits 27 and 28, connected to a source of pressure fluid (not shown), the conduit 27 feeding the pressure fluid and conduit 28 forming the return pipe for the fluid. The cylinder 7 communicates with feed conduits 32 and 33 which branch-off from conduits 29 and 30, respectively. In the end or reversing positions of slide 2, the slide valve 26 arranged in the valve sleeve 25 abuts with its ends against the stops 34 and 35 and causes reversing of the piston 21.

The operation of the described device is as follows: When pressure fluid is fed through the conduit 27 into the cylinder 25 as shown, the piston 21 will be displaced in the direction of arrow a, whereby the cutter slide 2 will correspondingly travel in the direction of the arrow b until the end 26a of the slide valve 26 abuts against the stop 35. The slide valve 26 will thereby be displaced into a position in which the feed conduit 27 is connected with conduit 29 over conduit 32, and pressure fluid will flow through the conduit 29 into the cylinder 22, while conduit 30 will communicate with the drain or return conduit 28. The piston 21 will then be reversed, i.e. moved in a direction opposite to that of the arrow a whereby simultaneously the direction of travel of the cutter slide 2 will be reversed correspondingly. Over conduit 32 the pressure fluid in conduit 29 will also act upon the piston 6, so that the latter will be displaced into its other end position and will effect a corresponding pivoting movement of the fork member 5 about pivot 4. Corresponding to the distance C between the axes A and B i.e. between pivot 4 and roll 9 which is adjustable over screw 13, the slide 3 will be displaced with respect to the slide 2 for instance by an amount D so that the tracer 35a will precede the milling cutter 36 by the distance D and will thereby compensate for the deflection of this tracer. By means of screw 13, the distance C may be set and therefore an amount of relative displacement D be introduced which will correspond to the working conditions. To this end the slide 10 may be provided with a vernier scale and the slide guide with a corresponding measurement scale. Adjustment data obtained in practice may be noted upon a diagram so that in carrying out analogous work the proper advance amount may be derived from this diagram.

Fig. 6 shows a modification of the connection between the slides 2 and 3. A cylinder 40 is connected to the slide 2. In this cylinder a control piston 42 is movably arranged. The ends 43a of a fork member 43 engage over the ends 42a of the control piston 42, the fork member being in this case rigidly connected to the arm 3b of the tracer slide 3. The piston 42 is provided with a conical recess 42b into which a conical pin 45 extends, the latter being adjustable by means of the micrometer screw 46. If the pin fully extends into the recess 42b so as to engage both side faces of recess at the same time, the connection between slides 2 and 3 will be a rigid one. By rotating the pin out of the recess 42b, the play D will be created, which permits a displacement of the piston 42 under the action of the pressure fluid, entering the cylinder 40 either through conduit 32 or 33, in one or the other direction. Consequently the tracer slide will be displaced with respect to the cutter slide by the amount of play D at the beginning of each stroke and will maintain this displacement throughout the length of the stroke of the two slides until the cutter slide is reversed by abutment of its reversing valve 26 against one of the stops, whereby a displacement of tracer slide in opposite direction by the amount D is effected at the same time, as described in connection with the embodiment of Figs. 1-5.

Thus it will be seen that the invention provides for means which will automatically displace the tracer slide with respect to the cutter slide at the beginning of one stroke i.e. forward stroke, in one direction and at the beginning of the subsequent or return stroke in a direction opposite thereto. The invention also provides for means which permit to vary the magnitude or amount of such relative displacement between cutter slide and tracer slide.

Various changes and modifications may be made without departing from the spirit and scope of the present invention and it is intended that such changes and modifications be included in the annexed claims.

What I claim is:

1. In a milling machine for automatic copying having a cutter, a tracer, supporting means, a cutter slide and a tracer slide arranged for independent reciprocating movement along said supporting means and in parallel directions with respect to each other; hydraulic drive means operatively connected with said cutter slide and including a cylinder and a piston movable in said cylinder, means supplying a fluid to said cylinder for moving said piston in either one of two directions and including a reversing valve movable between two end positions, said reversing valve when in said one end position causing movement of said piston in one of said directions and when in said other end position causing movement of said piston in the other of said directions to thereby reverse said cutter slide and cause said reciprocating movement thereof, and transmission means between said cutter slide and said tracer slide for transmitting to the latter said reciprocating movement of said cutter slide; actuating means supported by said cutter slide and including an actuating cylinder and an actuating piston, said actuating piston being operatively connected to said transmission means and movable between two locations to determine two positions of said tracer slide relative to said cutter slide, and conduit means connecting said actuating cylinder with said reversing valve for supplying said fluid to said cylinder and for moving said actuating piston into one of said locations thereof when said slide valve is in said one end position and into the other of said locations thereof when said reversing valve is in said other end position, to thereby displace said tracer slide between said two positions when said cutter slide is reversed and to cause a displacement of said tracer with respect to said cutter.

2. A machine according to claim 1, wherein adjustable stop means are provided in said actuating cylinder to cooperate with said actuation piston to thereby adjust the movement of the latter between said two locations thereof.

3. A machine according to claim 1, wherein said transmission means comprise a fork member pivotably supported by said cutter slide and engaging said piston, said fork member having a groove, said tracer slide having a slot, a pin slidably arranged in said slot and engaging said groove and means for moving said pin in said slot and in said groove.

4. In a milling machine for automatic copying having supporting means, a cutter slide and a tracer slide arranged for independent reciprocating movement along said supporting means and in parallel directions with respect to each other, hydraulic drive means operatively connected with said cutter slide and including a cylinder and a piston movable in said cylinder, means supplying a fluid to said cylinder for moving said piston in either one of two directions and including a reversing valve movable between two end positions, stop means carried by said supporting means and defining two reversing points of said cutter slide, said stop means being adapted to be engaged by said reversing valve when said cutter slide reaches a respective one of said reversing points thereof for movement of said reversing valve between said two end positions, said reversing valve when in one of said end positions causing movement of said piston in one of said directions and when in the other of said end positions causing movement of said piston in the other of said directions to thereby reverse said cutter slide and cause said reciprocating movement thereof, and transmission means between said cutter slide and said tracer slide for transmitting to the latter said reciprocating movement of said cutter slide; actuating means supported by said cutter slide and including an actuating cylinder and an actuating piston, said actuating piston being operatively connected to said transmission means and movable between two locations determining two positions of said tracer slide relative to said cutter slide, and conduit means connecting said actuating cylinder with said reversing valve for supplying said fluid to said cylinder and for moving said actuation piston into one location thereof when said slide valve is in said one end position and movement of said actuation piston into the other of said locations thereof when said reversing valve is in said other end position, to thereby displace said tracer slide into one of said positions thereof when said cutter slide is in one reversing position thereof and to displace said tracer slide into the other of said positions thereof when said cutter slide is in the other reversing position thereof.

References Cited in the file of this patent

UNITED STATES PATENTS

| 706,007 | Barr | Aug. 5, 1902 |

FOREIGN PATENTS

| 247,070 | Switzerland | Nov. 17, 1947 |
| 1,059,028 | France | Nov. 10, 1953 |